US008171782B2

(12) United States Patent
Strobel et al.

(10) Patent No.: US 8,171,782 B2
(45) Date of Patent: May 8, 2012

(54) TEST BENCH

(75) Inventors: Wolf-Dieter Strobel, Rutesheim (DE);
Alexander Zeissner, Weissach-Flacht (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 261 days.

(21) Appl. No.: 12/363,967

(22) Filed: Feb. 2, 2009

(65) Prior Publication Data
US 2009/0193883 A1    Aug. 6, 2009

(51) Int. Cl.
*G01M 15/00*    (2006.01)

(52) U.S. Cl. .................................. 73/116.07; 73/116.06

(58) Field of Classification Search .............. 73/116.01, 73/116.06, 116.07
See application file for complete search history.

(56) References Cited

U.S. PATENT DOCUMENTS 3,345,865 A * 10/1967 Ostrander ................... 73/116.11
3,520,180 A *  7/1970 Ris et al. ....................... 73/670
3,914,990 A * 10/1975 Borg ............................... 73/670
3,937,058 A *  2/1976 Hilbrands ..................... 73/11.08
4,283,956 A *  8/1981 Lechner et al. ................. 73/799
4,499,759 A *  2/1985 Hull ................................ 73/146
4,635,472 A *  1/1987 Scourtes ..................... 73/116.06
4,862,736 A *  9/1989 Treitz ......................... 73/117.01
4,942,762 A *  7/1990 Schober et al. ............ 73/116.07
4,953,391 A *  9/1990 Schober et al. ............ 73/116.07
5,003,819 A    4/1991 Koopmann
5,111,685 A *  5/1992 Langer ....................... 73/118.01
6,529,838 B1   3/2003 Horiuchi et al.

FOREIGN PATENT DOCUMENTS

| DE | 42 09 581 A1     | 8/1992  |
| DE | 94 05 141 U1     | 5/1994  |
| DE | 198 24 443 C1    | 8/1999  |
| DE | 10 2004 002 506 A1 | 8/2005 |
| EP | 08 86 130 A2     | 12/1998 |

* cited by examiner

*Primary Examiner* — Freddie Kirkland, III
(74) *Attorney, Agent, or Firm* — Laurence A. Greenberg; Werner H. Stemer; Ralph E. Locher

(57) ABSTRACT

A test bench for simulating oscillations with at least one roller that has a running face on at least part of which a roadway covering is applied. The roller is rotatably mounted and supported by an axle. At least one excitation device is provided, which additionally moves the roller in at least one spatial direction, in particular in the vertical direction of the vehicle.

11 Claims, 5 Drawing Sheets

TEST BENCH

CROSS-REFERENCE TO RELATED APPLICATION

This application claims the priority, under 35 U.S.C. §119, of German application DE 10 2008 008 061.6, filed Feb. 1, 2008; the prior application is herewith incorporated by reference in its entirety.

BACKGROUND OF THE INVENTION

Field of the Invention

The invention relates to a test bench for simulating oscillations for generating acceleration with frequencies, amplitudes and phase angles as in the real operation of the vehicle. The test bench includes at least one roller (3) which has a running face on at least part of which a roadway covering is applied. The roller is rotatably mounted about an axis of rotation.

It is known to measure the acceleration of a vehicle using individual components in the x, y and z directions in order to check the oscillatory behavior of the vehicle and of its components. Oscillations occur when the vehicle tires roll on a roadway covering and they are transmitted into the passenger compartment of the motor vehicle via the wheel suspension system and the vehicle body. Oscillations can be recorded by measuring the acceleration on a test track or on a test bench.

Rolling noise test benches are known in which a vehicle travels on a large roller which can have a circumference of up to 10 m, in which case the roller is covered with a corresponding roadway covering, for example rough asphalt.

A test bench of the generic type is disclosed in German published patent application DE 10 2004 002 506 A1. There, the running face of a roller is provided with openings into which compression means can be screwed. As a result, oscillations are generated with a frequency spectrum which corresponds to an excitation spectrum of a specific section of road or of a specific guideway or track.

A disadvantage of that assembly is that low-frequency oscillations cannot be reproduced, and as a result tests for driving comfort cannot be carried out. Further, so-called squeak and rattle tests, in which the vehicle is examined for creaking noises, are possible only to a restricted degree.

SUMMARY OF THE INVENTION

It is accordingly an object of the invention to provide a test bench, which overcomes the above-mentioned and other disadvantages of the heretofore-known devices and methods of this general type.

With the foregoing and other objects in view there is provided, in accordance with the invention, a test bench for simulating oscillations and for generating acceleration with frequencies, amplitudes, and phase positions, comprising:

at least one rotatably mounted roller having a running face and a roadway covering applied on at least part of the running face; and at least one excitation device disposed to move the roller in at least one spatial direction, preferably in an approximately vertical direction of a vehicle supported on the roller.

In accordance with an added feature of the invention, the roller is supported on an axle and the excitation device is connected to the axle for deflecting the axle about a design position thereof.

According to the invention, a test bench with at least one roller is provided for simulating vehicle oscillations. The roller has a running face on at least part of which a roadway covering is applied. The roadway covering is of correspondingly coarse or fine design depending on the roadway surface to be simulated. The vehicle is parked on the running face of the roller. As a result of the rotatable mounting, the roller can rotate about an axle. In addition to the excitation by the roadway covering on the running face of the roller, an additional excitation device or excitation means is provided which moves, i.e. can deflect, the roller in at least one spatial direction. The deflection device therefore brings about a superposed oscillation excitation on the vehicle or a pulsed roller. On the one hand, the roadway covering applies oscillations to the vehicle which are preferably in the frequency range above 30 Hertz. The excitation device can apply frequencies to the roller which are in the range up to 30 Hertz. The arrangement according to the invention can therefore be used to represent a large frequency range.

In one preferred embodiment of the invention, the excitation device can be connected to the axle of the roller and deflect the latter about its design position. That is to say, the axle of the roller is moved out of its spatial position with corresponding test sequences, with the result that the roller correspondingly also undergoes this movement.

An excitation device is preferably provided on each side of the roller. In this context, each excitation device acts on the axis of the roller. The excitation device(s) can therefore be given correspondingly smaller dimensions.

If the two excitation devices act synchronously on the axle, the spatial position of the roller can be changed in a defined fashion.

The excitation devices can preferably deflect or pulse the axle of the roller in the vertical direction (z) of the vehicle. For this, the bearing of the axle has to be correspondingly configured in such a way that this displacement is possible. In order to be able to simulate frequencies up to 30 Hertz, a displacement of the axle of ±50 mm is necessary.

Each of the rollers can be connected to a separate drive motor.

With a switching device, the drive motor can drive the roller in a first switched position. In a second switched position, the drive motor can tap power from the rotating roller. This has the advantage that the vehicle which is to be tested can either be driven by the rollers or itself drives the rollers by energizing the internal combustion engine.

In order to set the gauge or the wheelbase, it is possible to use the adjustment device to displace the roller in terms of its position in the longitudinal direction and/or transverse direction of the vehicle. The test bench can therefore be used for a large number of a wide variety of vehicles.

In one preferred embodiment, the excitation means can be what is referred to as a hydropulser, which is able to generate reciprocating movements in the frequency range of 0-30 Hertz in predefined test frequencies. Alternatively, other excitation means are conceivable which can generate corresponding reciprocating movements.

Other features which are considered as characteristic for the invention are set forth in the appended claims.

Although the invention is illustrated and described herein as embodied in a test bench, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
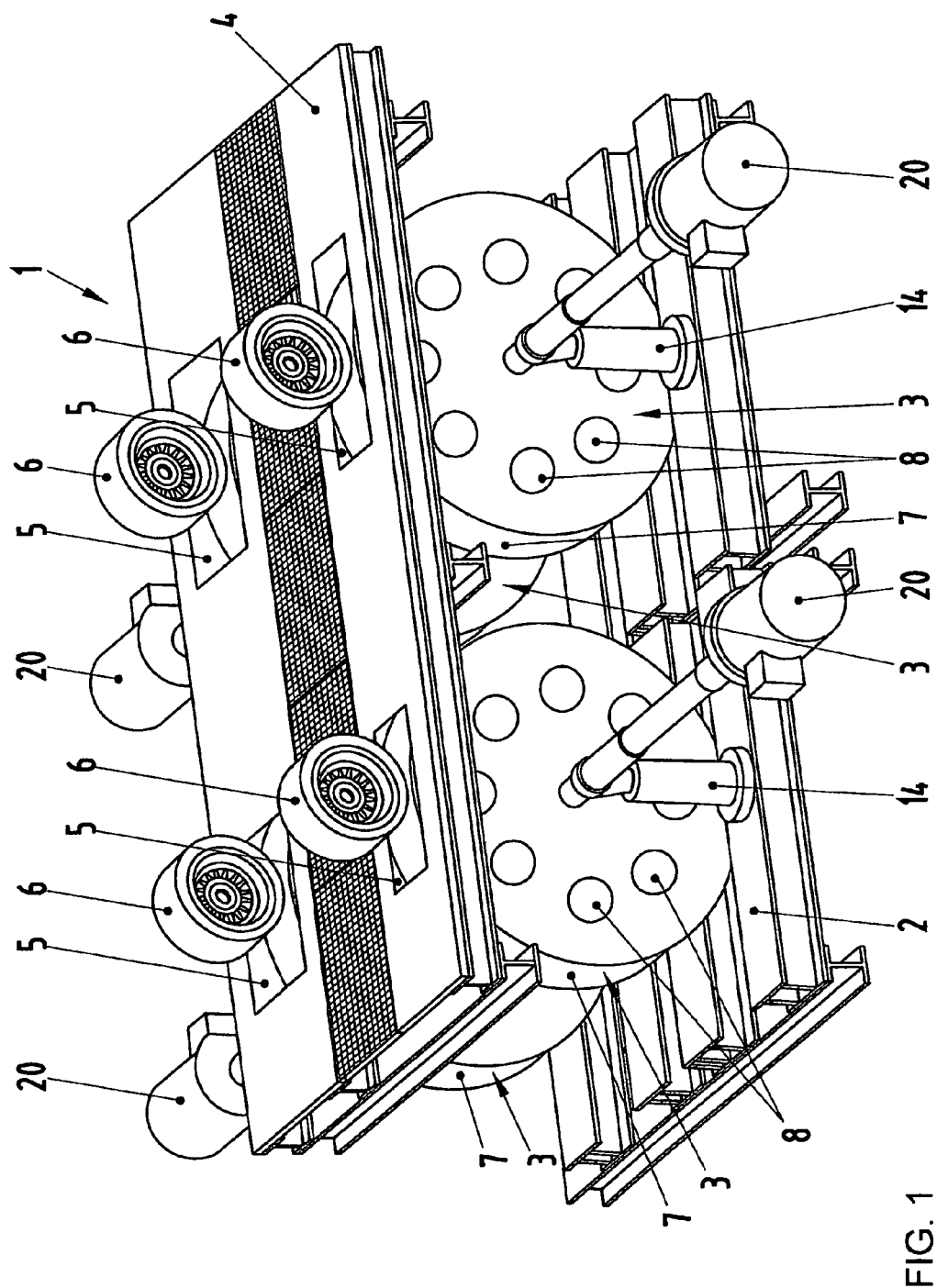
FIG. 1 is a perspective side view of an oscillation test bench according to the invention.

Referring now to the figures of the drawing in detail and first, particularly, to FIG. 1 thereof, there is shown an oscillation or vibration test bench 1 that is supported on a base 2. Four rollers 3 are provided between the base 2 and a baseplate 4, wherein each of the rollers 3 penetrates a corresponding cutout 5 in the baseplate 4. A vehicle, of which only the wheels 6 are illustrated in FIG. 1, is driven onto the oscillation test bench 1 via the baseplate 4. The wheels 6 are placed so that they overlap the rollers 3. The running face of each roller 3 is equipped with a roadway covering 7 which is to be tested. Furthermore, the rollers 3 are provided with openings 8 in the material in order to save weight. Alternatively, the rollers 3 may not be solid but rather equipped with spokes.

Figure 2:
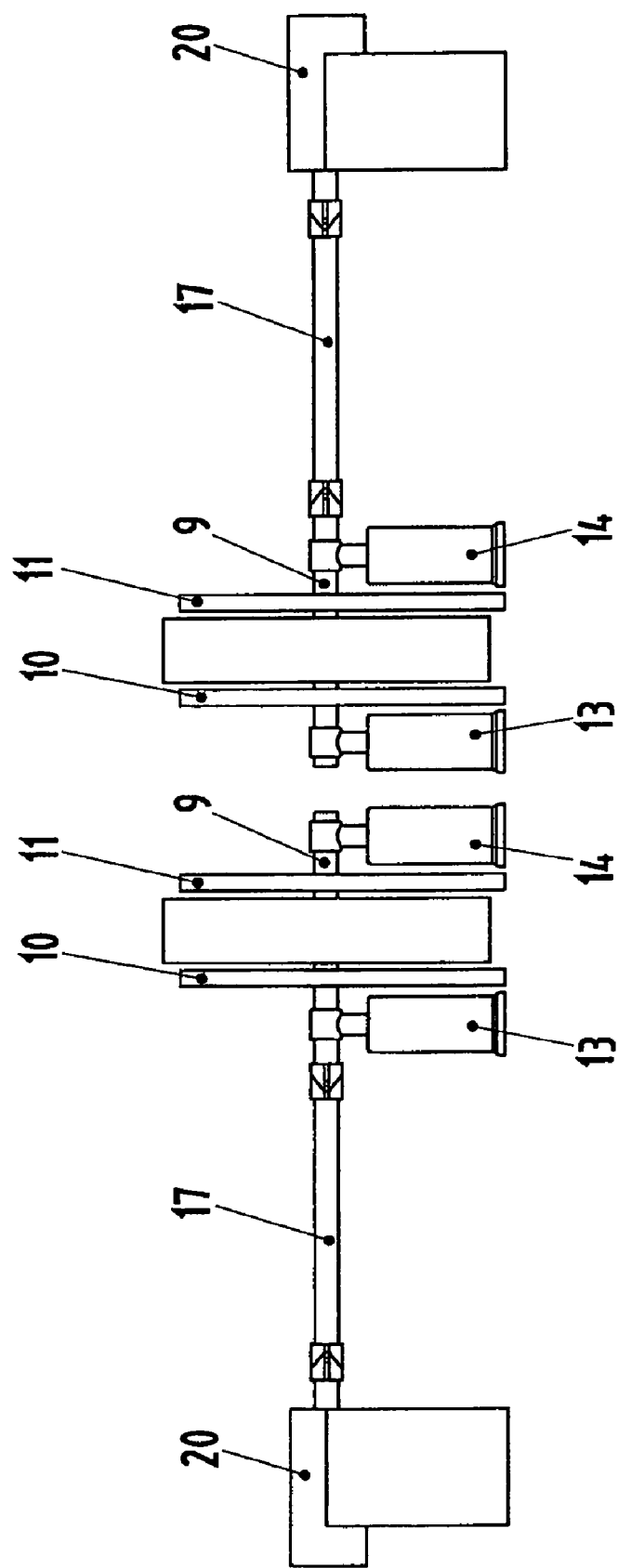
FIG. 2 is a front view of an oscillation test bench.

As is apparent from FIG. 2, each of the rollers 3 is permanently mounted on a separate axle 9. The axle 9 is mounted with bearing blocks 10 and 11 which are arranged on each side of the roller 3. So-called hydropulsers 13 and 14 are attached to the base 2 to the right and to the left next to the bearing blocks 10 and 11. The hydropulsers are excitation devices that are able to generate low-frequency reciprocating movements (up to approximately 30 Hertz) at predefined test frequencies.

Figure 3:
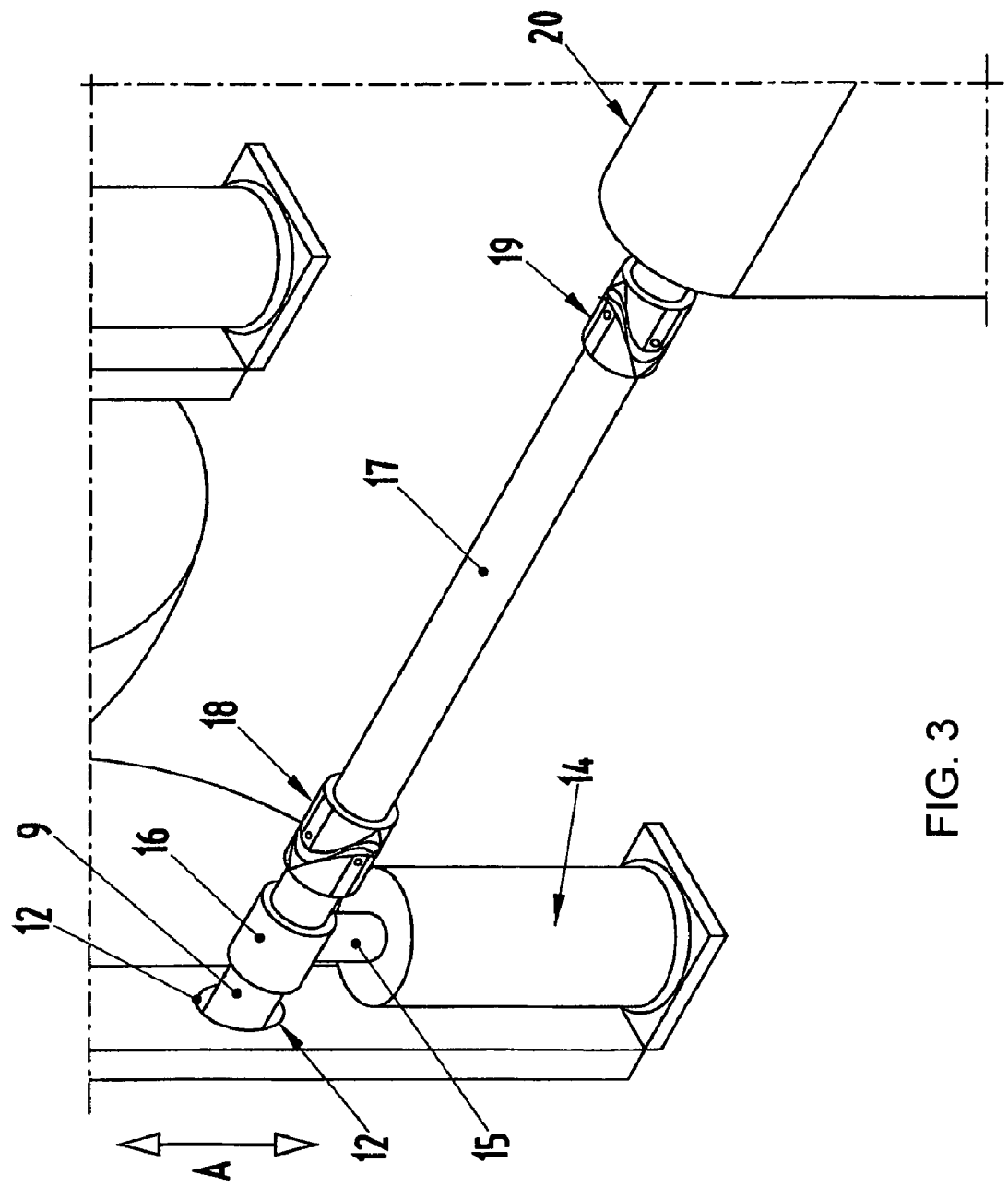
FIG. 3 is a perspective view of a detail of a hydropulser with a connected drive shaft.
Figure 5:
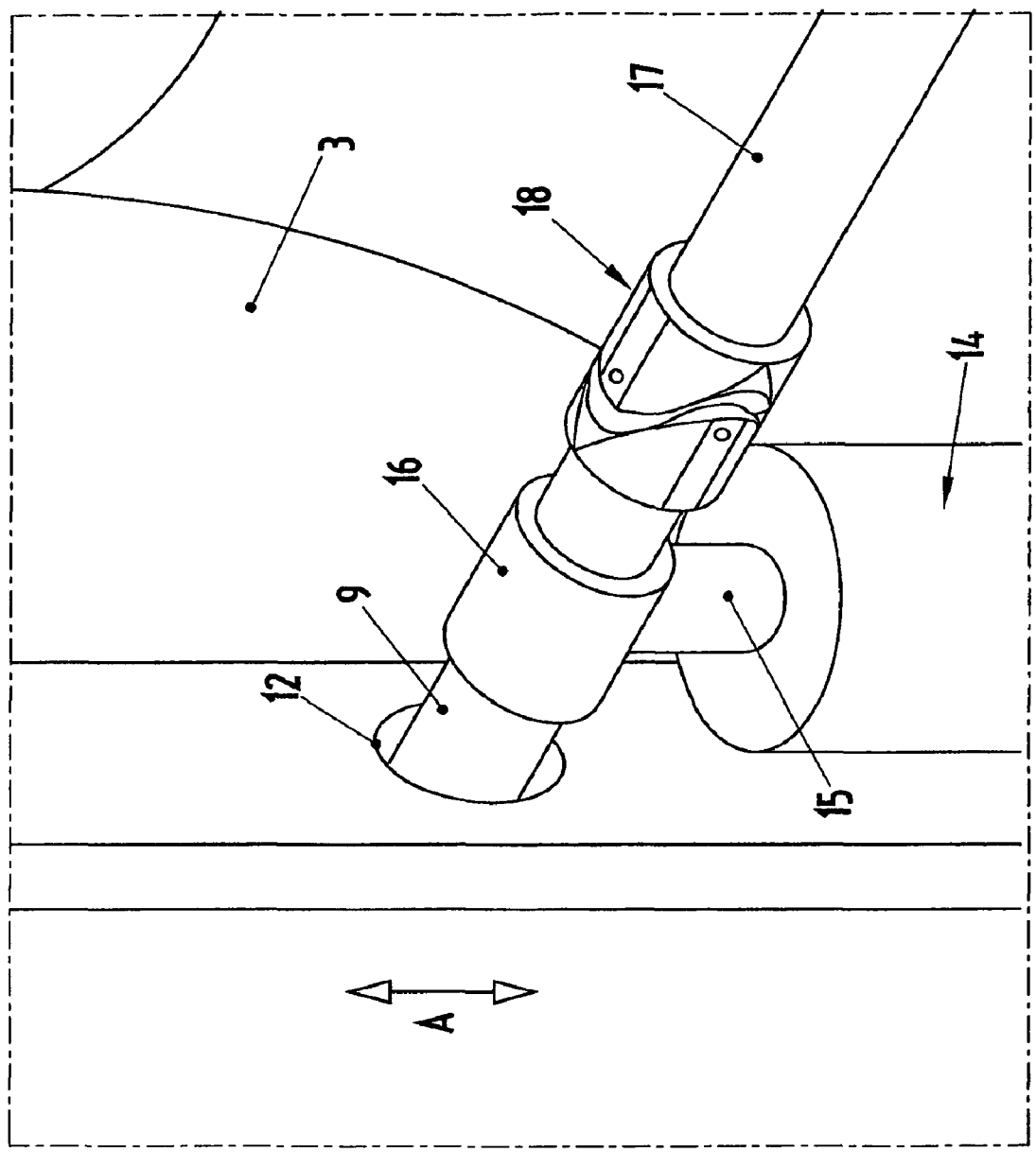
FIG. 5 is a perspective view of a detail of the bearing according to FIG. 4.

The illustration of the detail according to FIG. 3, and respectively according to FIG. 5, shows that the hydropulser 14 comprises a lift rod 15, the upper free end of which has a bearing bush 16 for the axle 9 to pass through. The lift rod 15 can execute a stroke of approximately 100 mm travel. The two hydropulsers 13 and 14 which are assigned to a roller are operated synchronously at selected test frequencies, with the result that the axle 9 moves up and down in a defined fashion in the direction A of the arrow.

For this movement, the bearing blocks 10 and 11 for the axle 9 to pass through are equipped with a bearing 12 that permits a corresponding vertical movement of the axle 9 in the direction A of the arrow.

The axle 9 is connected at its outward pointing end to a cardan shaft 17 via a joint 18. The cardan shaft 17, also referred to as a drive shaft 17, is connected to an electric machine 20 via a further joint 19. In order to compensate for the vertical travel of the axle 9 in the direction A of the arrow, both joints 18 and 19 are configured as universal joints for corresponding angle compensation. The electric machine 20 is preferably an electric drive motor 20 which drives the rollers 3. A separate electric machine 20 is provided for each of the rollers 3. The electric machine can also optionally tap power, in particular if the vehicle is energized by means of its internal combustion engine, i.e. is traveling on the oscillation test bench and as a result drives the rollers 3.

Figure 4:
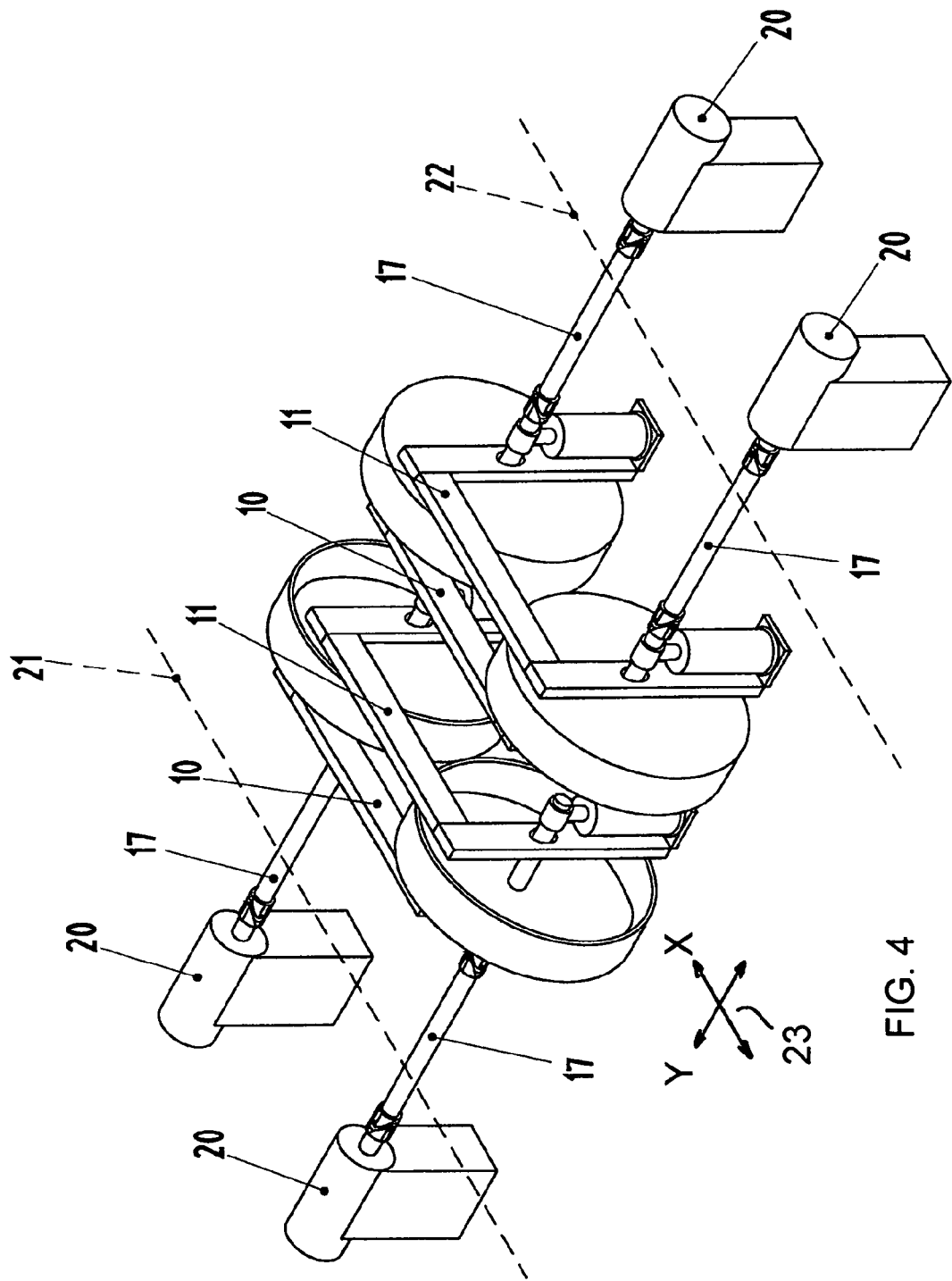
FIG. 4 is a perspective illustration of the oscillation test bench according to FIG. 1.

FIG. 4 shows walls 21, 22—indicated by way of the dashed lines 21, 22—between the motors 20 and the test bench per se. The walls 21, 22 can be of sound-insulating design. This has the advantage that the influences of the drive motors 20 can be reduced to acoustic measurements in the vehicle or on the test bench.

The excitation of oscillations on the vehicle can be simulated between 0 to 500 Hertz with the proposed oscillation test bench. In this context, the hydropulser implements excitation in the range between 0 and 30 Hertz, which constitutes a travel of ±50 mm in the direction A of the arrow. The higher oscillations above 30 Hertz are brought about by superposing the oscillations which result from the roadway covering on the rollers.

All the speeds which are relevant to road vehicles can be reached with the oscillation test bench as a function of the configuration of the rollers and the way in which the covering is applied. For the adjustment of the wheelbase and the gauge, the rollers can be mounted in such a way that they can be displaced in the X and Y directions. An adjustment device or displacement device 23 is provided for this purpose. The device 23 is schematically shown with reference to a longitudinal direction X and a transverse direction Y of a vehicle.

The invention claimed is:

1. A test bench for simulating oscillations and for generating acceleration with frequencies, amplitudes, and phase positions, comprising:
   rotatably mounted rollers each having a running face and a roadway covering applied and fixed directly on and surrounding at least part of said running face, each of said rollers supporting a wheel of a vehicle under test and only one said roller provided for each of said wheels of the vehicle and supporting only one wheel of the vehicle;
   at least one excitation device disposed to move said rollers in at least one spatial direction, said excitation device disposed to a side of one of said rotatably mounted rollers; and
   an axle, said rotatably mounted rollers supported on said axle and said excitation device directly connected to said axle for deflecting said axle about a design position thereof.

2. The test bench according to claim 1, wherein said excitation device is configured to move said rollers in a substantially vertical direction of a vehicle supported on said rollers.

3. The test bench according to claim 1, wherein said excitation device includes excitation devices respectively disposed on each side of said one roller, with each said excitation device connected to said axle.

4. The test bench according to claim 3, wherein said two excitation devices act synchronously on said axle.

5. The test bench according to claim 3, wherein said excitation devices are configured to deflect said axle in a vertical direction.

6. The test bench according to claim 1, which comprises an electric machine connected to said rollers.

7. The test bench according to claim 6, wherein said electric machine is an electric motor for driving said rollers.

8. The test bench according to claim 7, wherein said electric machine is configured to operate as a generator for tapping power from said rotating rollers.

9. The test bench according to claim 1, further comprising an adjustment device for adjusting and displacing said rollers in at least one of a longitudinal direction and a transverse direction.

10. The test bench according to claim 1, wherein said excitation device is a hydropulser.

11. A test bench for simulating oscillations and for generating acceleration with frequencies, amplitudes, and phase positions, comprising:
- a rotatably mounted roller having a running face and a roadway covering applied directly on and surrounding at least part of said running face, said roller supporting a wheel of a vehicle under test and only one wheel of the vehicle;
- at least one excitation device disposed to move said roller in at least one spatial direction, said excitation device disposed to a side of said rotatably mounted roller; and
- an axle, said rotatably mounted roller supported on said axle and said excitation device directly connected to said axle for deflecting said axle about a design position thereof.

* * * * *